Dec. 7, 1948.  Z. G. HAWK  2,455,675

MACHINE FOR HANDLING AND PREPARING OYSTERS

Filed Dec. 6, 1946

Inventor
Zoid G. Hawk

By Murray, Sackhoff & Paddack
Attorneys

Patented Dec. 7, 1948

2,455,675

UNITED STATES PATENT OFFICE 2,455,675

MACHINE FOR HANDLING AND PREPARING OYSTERS

Zoid G. Hawk, Findlay, Ohio

Application December 6, 1946, Serial No. 714,501

3 Claims. (Cl. 17—3)

The present invention relates to a machine and method for handling and preparing certain kinds of sea food and is particularly directed to a device and process for cleaning food material from the intestines of shelled oysters, or the like.

An object of the invention is to provide a means for increasing the palatableness and flavor of the oyster by removing therefrom in a novel and efficient manner the food material lodged in the intestine of said oyster.

The invention also consists in the novel sequence of steps for attaining the foregoing objectives and also the combination and arrangement of parts of the machine for carrying out said steps set forth in the following specification and the accompanying drawing and particularly pointed out in the claims.

Figure 1:
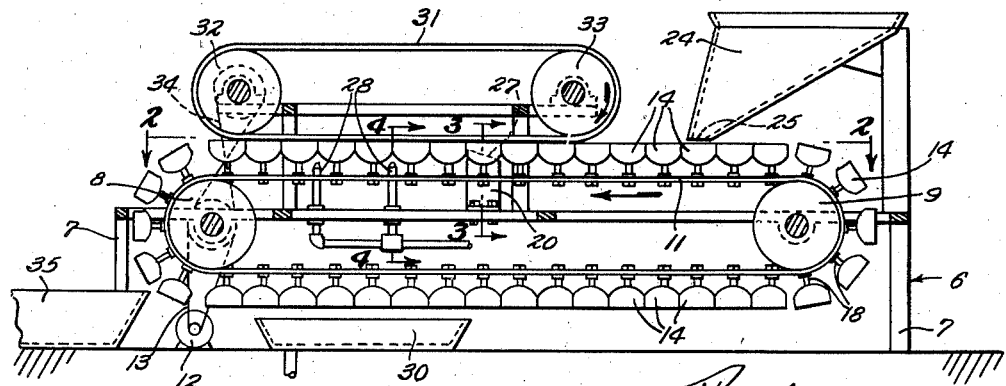
Fig. 1 is a side elevational view of my machine for cleaning shelled oysters, parts thereof being shown in cross-section and other parts illustrated diagrammatically.

It is well known that the food material lodged in the intestine of an oyster causes a slightly unpalatable flavor to it when it is consumed and it is to effect the elimination of this undesirable taste factor that the objects of this invenion are directed. My method of cleaning the food material from the intestines of shelled oysters consists in the step of moving individual oysters on a conveyor, and holding the oyster on the conveyor against displacement therefrom, and thereafter, forming a knife cut through each oyster and into the intestine thereof. After the cut has been formed a stream or jet of fluid under pressure is directed into the cut to flush the food material therefrom.

The foregoing steps will be more clearly understood from a description of the machine for carrying out said steps and with reference to the drawings the numeral 6 generally indicates a machine frame supported above a floor upon suitable legs 7. Rollers 8 and 9 are suitably journaled for rotation on the frame and support between them a pair of transversely spaced endless conveyors 10 and 11. The conveyor is moved in the direction of the arrow by means of a motor 12 which drives the roller 8 through suitable chain and sprocket arrangement 13.

Figure 2:
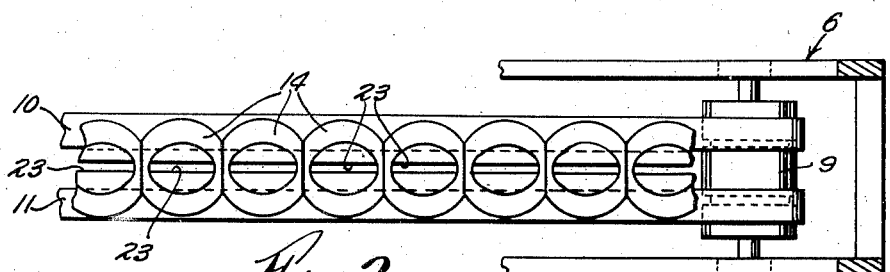
Fig. 2 is a fragmental top plan view of the conveyor taken on line 2—2 of Fig. 1.
Figure 3:
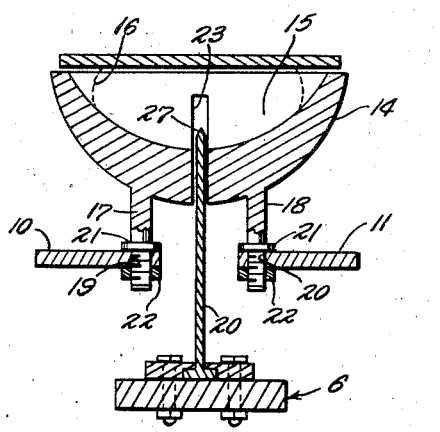
Fig. 3 is an enlarged cross-sectional view taken on line 3—3 of Fig. 1.
Figure 4:
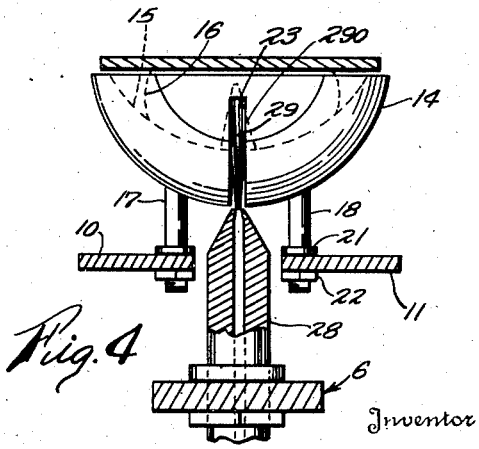
Fig. 4 is an enlarged cross-sectional view taken on line 4—4 of Fig. 1.

A plurality of oyster receiving cups 14 are each mounted between the conveyors and as most clearly indicated in Figs. 2-4 each cup is provided with an elliptically shaped concave portion 15 for receiving an oyster 16. To provide an uninterrupted cup surface along the upper reach of the conveyor the adjacent portions of each cup are provided with transversely extending edges which are in abutment with similar transverse edges on adjacent cups. Each cup is supported upon the conveyor by a pair of spaced, depending legs 17 and 18 which pass through openings 19 and 20 respectively formed through the adjacent edge portions of the belts 10 and 11. The depending legs are preferably provided with shoulders 21 which are in abutment with the top surfaces of the conveyors and the lower ends thereof are threaded to cooperate with suitable nuts 22 drawn up against the undersides of the conveyors. Each cup is also provided with a longitudinally extending through-slot 23 which is formed in the bottom thereof and is disposed in longitudinal alignment with the slots of adjacent cups upon the conveyor.

Each of the cups pass beneath a feed hopper 24, the restricted opening 25 thereof being disposed close to the continuous cup surface and permits an individual oyster to fall into the elliptical recess 15 of each cup as it passes thereunder.

The oysters in the cups are conveyed past a knife 20 mounted on the frame and extending upwardly between the conveyors 10 and 11, the cutting edge 27 being positioned in alignment with the through-slots in the cups and adapted to project through the slots to cut into the intestine of each oyster. As illustrated in Fig. 1 the knife edge may be inclined so that the lower portion of the edge will first contact the oyster and as said oyster is moved longitudinally past the knife the edge will make a progressively deeper cut therein. After the cut has been made the oyster is moved by the conveyor past one or more fluid pressure nozzles 28 mounted on the frame between the conveyors and as illustrated in Fig. 4, are directed to force a stream of fluid 29 through the slot 23 and into the knife cut 290 previously formed in the oyster. The stream flushes the food material from the intestine of the oyster and said fluid and food material may be caught in a suitable trough 30 disposed beneath the nozzles.

To maintain the oysters within the cups during the cutting and the food flushing operations an endless oyster hold down belt 31 is mounted on the frame 6 for rotation between endless rollers 32 and 33. The lower reach of the belt is positioned superjacent the tops of the cups and as illustrated in Figs. 3 and 4 the belt comes in contact with the upper portion of the oysters 16 as they are moved by the conveyor in the cups. The lower reach of the hold down belt is moved in the direction of the upper reach of the conveyor and at the same speed therewith by a sprocket and chain connection 34 with the driven conveyor roller 8. The cleaned oysters may be deposited in a suitable container 35 positioned beneath the discharge end of the conveyor.

It will therefore be noted that I have provided a simplified method and efficient means for increasing the palatableness and flavor of shelled oysters by removing therefrom food material lodged in the intestines thereof. While there is shown and described herein certain specific machine structure and certain method steps for carrying out my invention, it will be manifest to those skilled in the art that various modifications may be made therein without departing from the scope of the invention particularly set forth in the appended claims. Obviously the size of the oyster cups 14 may be varied and the opening 25 in the feed hopper made larger or smaller to provide machines for operation upon oysters of a particular grade or size and it is also contemplated that the number of pressure nozzles may be varied in accordance with the particular cleansing requirements of the machine.

What is claimed is:

1. In a machine for cleaning food material from the intestines of shelled oysters, the combination of a conveyor, a succession of oyster receiving pockets carried on the conveyor and each adapted to support an oyster therein, a fixed knife blade positioned in the path of the conveyed oysters, a source of fluid pressure, a fixed nozzle means positioned to direct a jet of said fluid into the cuts in the oysters made by the knife, and a hold-down cover positioned adjacent the holders and opposed to the positions of the knife and the nozzle means.

2. In a machine for cleaning food material from the intestines of shelled oysters the combination of a frame, an endless conveyor on the frame, means for moving said conveyor, a plurality of oyster receiving cups mounted on the conveyor and each having a longitudinal through-slot formed in the bottom thereof, a knife mounted in the frame beneath the conveyor and having its cutting edge disposed in alignment with the through-slots in the cups and adapted to project through the slots to cut into the intestines of the oysters as they are moved by the conveyor, and a fluid pressure nozzle mounted beneath the conveyor in spaced relation with the knife and directed to force a stream of food flushing fluid through the slots and into the knife cuts in the conveyed oysters.

3. In a machine for cleaning food material from the intestines of shelled oysters the combination of a frame, a pair of transversely spaced endless conveyors on the frame, means for moving the conveyors in unison, a plurality of oyster receiving cups each mounted between the conveyors and each having a longitudinal through-slot formed in the bottom thereof in longitudinal alignment with the slots in adjacent cups, a knife mounted on the frame between the conveyors said knife having its cutting edge positioned in alignment with the through-slots in the cups and adapted to project through the slots to cut into the intestine of each oyster, a fluid pressure nozzle mounted between the conveyors in spaced relation with the knife and directed to force a stream of food flushing fluid through the slots and into the knife cuts in the oysters, an endless oyster hold down belt mounted on the frame superjacent the cups, and means for moving said belt in the direction of the conveyors.

ZOID G. HAWK.

REFERENCES CITED

The following references are of record in the file of this patent:

UNITED STATES PATENTS

| Number | Name | Date |
|---|---|---|
| 848,450 | Deloe | Mar. 26, 1907 |
| 1,134,529 | Hauber | Apr. 6, 1915 |
| 1,134,530 | Hauber | Apr. 6, 1915 |
| 1,179,101 | Hendricks et al. | Apr. 11, 1916 |
| 2,354,928 | Ragupos | Aug. 1, 1944 |
| 2,391,739 | Ragupos | Dec. 25, 1945 |